United States Patent [19]

Sparlin

[11] Patent Number: 4,771,829
[45] Date of Patent: Sep. 20, 1988

[54] WELL LINER WITH SELECTIVE ISOLATION SCREEN

[76] Inventor: Derry D. Sparlin, 14614 Falling Creek, Suite 124, Houston, Tex. 77068

[21] Appl. No.: 139,328

[22] Filed: Dec. 30, 1987

[51] Int. Cl.$^4$ ............................................. E21B 43/08
[52] U.S. Cl. ..................................... 166/233; 166/236
[58] Field of Search ............... 166/233, 231, 232, 234, 166/236, 227, 205, 157, 158, 181, 182, 143; 210/497.1

[56] References Cited

U.S. PATENT DOCUMENTS

| | | | |
|---|---|---|---|
| 2,162,799 | 6/1939 | Church | 166/233 |
| 2,257,344 | 9/1941 | Maloney | 166/236 X |
| 3,880,233 | 4/1975 | Muecke et al. | 166/205 |
| 3,908,256 | 9/1975 | Smith, III | 166/233 X |
| 4,167,972 | 9/1979 | Sears | 166/233 |
| 4,487,259 | 12/1984 | McMichael, Jr. | 166/236 |

Primary Examiner—Stephen J. Novosad

[57] ABSTRACT

A well liner having a selective isolation screen comprises an elongate base pipe having a predetermined number of openings therethrough which is surrounded by circumferentially spaced, longitudinally extending spacer bars, one or more annular cylindrical sleeves secured to the exterior of the base pipe and a continuous wire wrapped therearound to form an inner annulus isolated at predetermined vertical locations corresponding to specific well requirements of varying lengths and production formations within the wellbore. The continuous wire is wrapped over the spacer bars and sleeves in a spaced spiral configuration to provide a predetermined constant gap between the wire wrapping. The gaps in the wire wrapping are sized to stop the movement of the formation sand and allow continual flow of fluid into the wellbore. Gravel or other particulate matter may be pumped down the borehole in the outer annulus between the interior of the borehole or an outer casing and the outer surface of the wire wrapping. The gravel and other particulates are sized to restrain movement of the formation sand and the screen openings or gaps are designed to restrain the movement of the gravel or particulates to allow continual flow of fluids therethrough.

27 Claims, 2 Drawing Sheets

WELL LINER WITH SELECTIVE ISOLATION SCREEN

BACKGROUND OF THE INVENTION

1. Field of the Invention

This invention relates generally to the field of oil well production equipment, and more particularly to a wire wrapped screen providing selective isolation for filtering sand at subterranean locations.

2. Brief Description of the Prior Art

Numerous screen designs are known in the art for excluding sand and detrita from a wellbore as water, oil, or gas is being produced from, or injected into, a subterranean location. Screens are sometimes used as the sole means of filtering sand from the fluids wherein the screen openings are sized to stop the movement of the formation sand and allow continual flow of fluid into the wellbore. Gravel or other particulate matter is also used in conjunction with screens such as "gravel pack" screens wherein the gravel or particulates are sized to restrain movement of the formation sand and the screen openings are designed to restrain the movement of the gravel or particulates to allow continual flow of fluids therethrough.

Common well liner screens employ a base pipe having a plurality of openings through the sidewall which is surrounded by longitudinally extending spacer bars, rods, or rings and over which a continuous wire is wrapped in a carefully spaced spiral configuration to provide a predetermined constant gap between the wire wrapping. The gap allows fluids to flow through the screen and retains the movement of particulate materials such as sand or gravel. Such a screen is commonly referred to as a "wire wrapped" screen.

Most "wire wrapped" screens have the common feature of an "inner annulus" or space between the base pipe and the wire wrapping. The "inner annulus" is desirable for the purpose of allowing free transmission of fluids that flow through the wire wrapping gaps into the openings of the base pipe. The absence of the inner annulus would significantly restrict fluid flow rates.

The inner annulus in a wire wrapped screen causes several serious problems during installation of a gravel pack and the stimulation of a screen or gravel pack. Problems are associated with bypassing of fluid through the inner annulus as the gravel is being transported down the outer annulus or space between the wire wrapping and wellbore and bypassing of fluid being injected, or produced into or from a screen or gravel pack.

Bridges of gravel are in part created, or enhanced, as fluid that carries the gravel flows into the inner annulus causing an effective increase of gravel concentration in the fluid that remains in the outer annulus because the gravel cannot enter through the wire wrapping but fluid can do so freely. If the gravel concentration increases beyond a critical magnitude it will form a bridge which wedges in the outer annulus and halts further movement of gravel before the outer annulus is fully packed with gravel.

Another problem caused by fluid freely entering the inner annulus from the outer annulus during gravel packing highly deviated wellbores is commonly referred to as "duning". In wellbores having angles of from 45° to 90° from vertical, especially those requiring the gravel to be packed along intervals ranging from several feet to more than a thousand feet, the gravel tends to fall to the low side of the wellbore by gravity as the gravel is transported by a carrying fluid. As gravel accumulates, the fluid is diverted to the high side of the wellbore and into the inside of the screen, thereby reducing the velocity of carrier fluid flow in the outer annulus and the capability of the fluid to force gravel toward the bottom, or end, of the outer annulus.

Gruesbeck et al, U.S. Pat. No. 4,046,198, attempts to solve this problem by providing a means of inserting a wash pipe in the base pipe to reduce the ease with which fluid can flow into the pipe. Maly et al, U.S. Pat. No. 3,637,010 teaches the use of flexible baffles to restrict the flow of fluids into the base pipe. However, both patents ignore the effect of the inner annulus between the base pipe and screen. Other relevant patents are: Jones, U.S. Pat. No. 3,428,128; Van Westrum, U.S. Pat. No. 2,155,744; Gurley et al, U.S. Pat. No. 3,789,927; Burns, U.S. Pat. No. 2,942,664; and Chancellor et al, U.S. Pat. No. 3,153,451.

Another problem occurs in wells where voids, or areas where no gravel was packed in the outer annulus, are found in the gravel pack. Such voids will allow sand to be produced freely to the screen, in some cases through the screen, and in other cases causing severe erosion of the screen and ultimate failure of the screen to stop sand incursion. One method to solve the problem of voids without having to remove the screen from the wellbore is to wash the gravel pack with a downhole washing tool. This will sometimes disturb the gravel arrangement sufficiently to settle the pack and fill the void spaces. However, the effect of the washing operations is reduced by free flow of fluids vertically up or down the inner annulus instead of radially out into the gravel. Thus some, or most, of the washing fluids will bypass the gravel and restrict the turbulent action necessary to rearrange the gravel located in the outer annulus.

Other problems are caused during attempts to stimulate a well that has a screen or a screen with a gravel pack, as the stimulation fluids are difficult to inject into the portion of the screen or gravel pack where the stimulation fluid is needed. Common stimulation fluids are hydrochloric acid, a combination of hydrochloric acid and hydrofluoric acid, diesel oil, kerosene, aqueous solutions, dispersions or emulsions of surfactants, and the like, which are injected into the screen or gravel packed wellbore via the inner pipe.

The stimulation fluids are forced out through the screen, gravel, and into the subterranean formation to dissolve, or remove, materials that are plugging or restricting the flow of fluids. Such plugging materials are commonly carbonaceous, siliceous, or organic solids and the like, which will be attacked or dispersed physically or chemically, and pushed away from the wellbore and subsequently flowed out of the wellbore with the produced fluids. Since the stimulation fluids must adequately contact the plugging materials to effectively remove them, it is imperative that the stimulation fluids be injected into the areas where the plugging materials have mostly accumulated. However, the stimulation fluids follow the path of least resistance into the portions of the gravel packed well bypassing the portions of the formation or gravel pack which are most severely plugged.

A common method of combating this problem is to use a special injection tool arrangement that mechanically isolates short sections of the screen or gravel pack inside the base pipe of the screen. This helps force some of the stimulation fluids into directed portions of the screen or gravel pack, but the inner annulus cannot be isolated by such a tool, and allows much of the injected stimulation fluids to bypass away from the intended zone.

Woodruff, U.S. Pat. No. 2,796,939 discloses a well liner having compartments prepacked with gravel which is lowered into the wellbore as an integral unit and in which fluid backwashed downwardly therethrough is directed outwardly through the gravel.

Even when injection isolation tools are employed, injection fluids such as steam, water, and the like, are transferred to zones where these fluids are not needed. When unwanted water or gas is being produced from a part of the well within the gravel packed interval and a sealing chemical or material is injected into the gravel pack to seal the gravel and stop the production of the unwanted fluid, the sealing chemical may bypass the desired zone via the inner annulus.

The present invention is distinguished over the prior art in general, and these patents in particular by a well liner having a selective isolation screen including an elongate base pipe having openings therethrough which is surrounded by circumferentially spaced, longitudinally extending spacer bars, one or more annular cylindrical sleeves secured to the exterior of the base pipe and a continuous wire wrapped therearound to form an inner annulus isolated at predetermined vertical locations corresponding to specific well requirements of varying lengths and production formations within the wellbore. The continuous wire is wrapped over the spacer bars and sleeves in a spaced spiral configuration to provide a predetermined constant gap between the wire wrapping. The gaps in the wire wrapping are sized to stop the movement of the formation sand and allow continual flow of fluid into the wellbore. Gravel or other particulate matter may be pumped down the borehole in the outer annulus between the interior of the borehole or an outer casing and the outer surface of the wire wrapping. The gravel and other particulates are sized to restrain movement of the formation sand and the screen openings or gaps are designed to restrain the movement of the gravel or particulates to allow continual flow of fluids therethrough.

SUMMARY OF THE INVENTION

It is therefore an object of the present invention to provide a well liner screen having sealing means for selectively isolating and sealing the inner annulus of the screen at selected locations.

It is another object of this invention to provide a well liner screen having one or more sleeves within the inner annulus at predetermined locations corresponding to specific well requirements of varying lengths and production formations within the wellbore.

Another object of this invention is to provide a well liner screen which will effectively control the injection of acids and fluids into the screen such that every section of the screen may be selectively washed.

Another object of this invention is to provide a well liner screen whereby fluids may be injected into selective sections of the screen to prevent bypassing of fluids through the inner annulus.

Another object of this invention is to provide a well liner screen which will facilitate gravel packing operations in highly deviated wellbores.

A further object of this invention is to provide a well liner screen which will aid in injection of water shut off chemicals, diverting of injected water from thief zones, and other treatments requiring some control or injection into selected locations.

A still further object of this invention is to provide a well liner screen which is simple in construction, economical to manufacture, and rugged and durable in use.

Other objects of the invention will become apparent from time to time throughout the specification and claims as hereinafter related.

The above noted objects and other objects of the invention are accomplished by a well liner having a selective isolation screen comprising an elongate base pipe having a predetermined number of openings therethrough which is surrounded by circumferentially spaced, longitudinally extending spacer bars, one or more annular cylindrical sleeves secured to the exterior of the base pipe and a continuous wire wrapped therearound to form an inner annulus isolated at predetermined vertical locations corresponding to specific well requirements of varying lengths and production formations within the wellbore. The continuous wire is wrapped over the spacer bars and sleeves in a spaced spiral configuration to provide a predetermined constant gap between the wire wrapping. The gaps in the wire wrapping are sized to stop the movement of the formation sand and allow continual flow of fluid into the wellbore. Gravel or other particulate matter may be pumped down the borehole in the outer annulus between the interior of the borehole or an outer casing and the outer surface of the wire wrapping. The gravel and other particulates are sized to restrain movement of the formation sand and the screen openings or gaps are designed to restrain the movement of the gravel or particulates to allow continual flow of fluids therethrough.

DESCRIPTION OF THE PREFERRED EMBODIMENT

Figure 1:
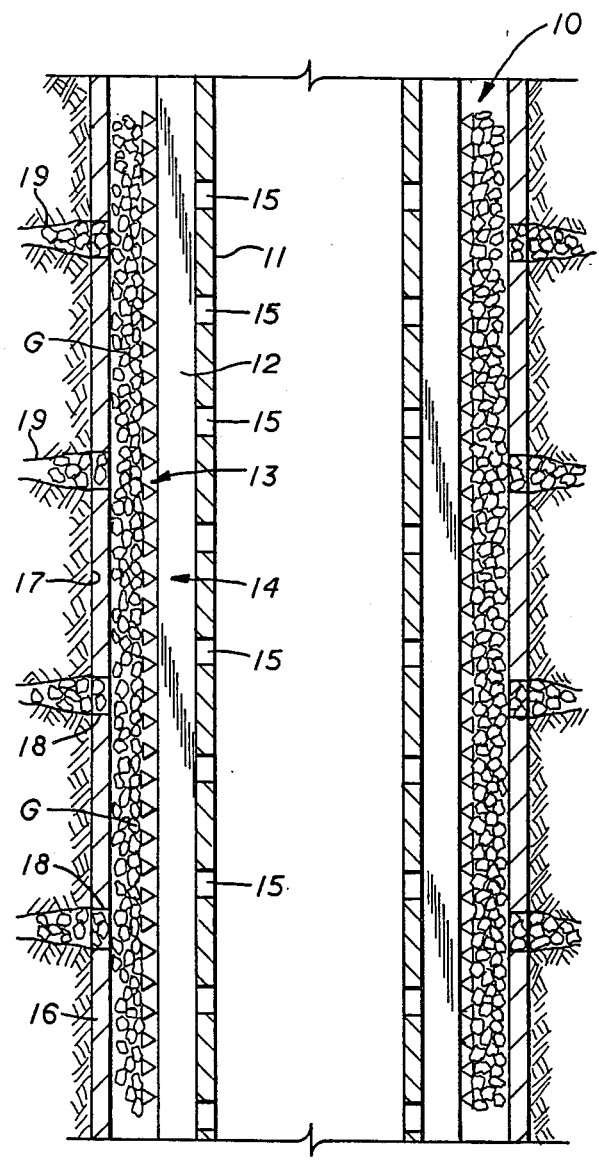
FIG. 1 is a longitudinal cross section of a well liner screen of the prior art.

Referring to the drawings by numerals of reference, there is shown in FIG. 1, a well liner screen 10 commonly referred to as a "wire wrapped" screen according to the prior art. Prior art screens of this type employ a base pipe 11 surrounded by longitudinally extending spacer bars 12 and over which a continuous wire 13 is wrapped in a carefully spaced spiral configuration to provide a predetermined constant gap between the wire wrapping and an inner annulus 14 between base pipe 11 and wire wrapping 13. The base pipe 11 has a plurality of openings 15 through the sidewall.

The screen 10 is shown inside of an outer casing 16 which is placed in the wellbore 17. It should be understood that the present screen may also be used in uncased wellbores with no outer casing. The casing 16 has been perforated 18 to allow production of fluids from formations 19 at preselected zones. As fluid flows from the formations 19, sand and other particulate material is carried with the fluid and enter the borehole. Screens are sometimes used as the sole means of filtering sand from the fluids wherein the gaps in the wire wrapping 13 are sized to stop the movement of the formation sand and allow continual flow of fluid into the wellbore.

Gravel or other particulate matter is also used in conjunction with screens such as "gravel pack" operations wherein gravel G or other particulates are pumped down the borehole in the outer annulus between the casing 16 and the outer surface of the wire wrapping 13. The gravel G and other particulates are sized to restrain movement of the formation sand and the screen openings 15 are designed to restrain the movement of the gravel or particulates to allow continual flow of fluids therethrough.

Figure 2:
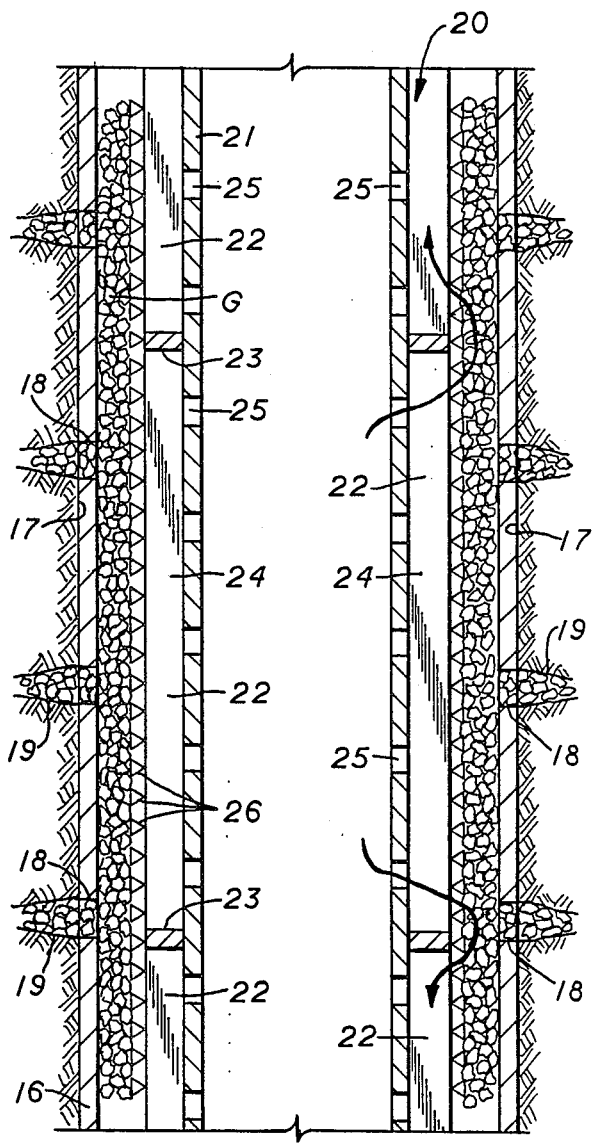
FIG. 2 is a longitudinal cross section of the well liner having a selective isolation screen in accordance with the present invention.
Figure 3:
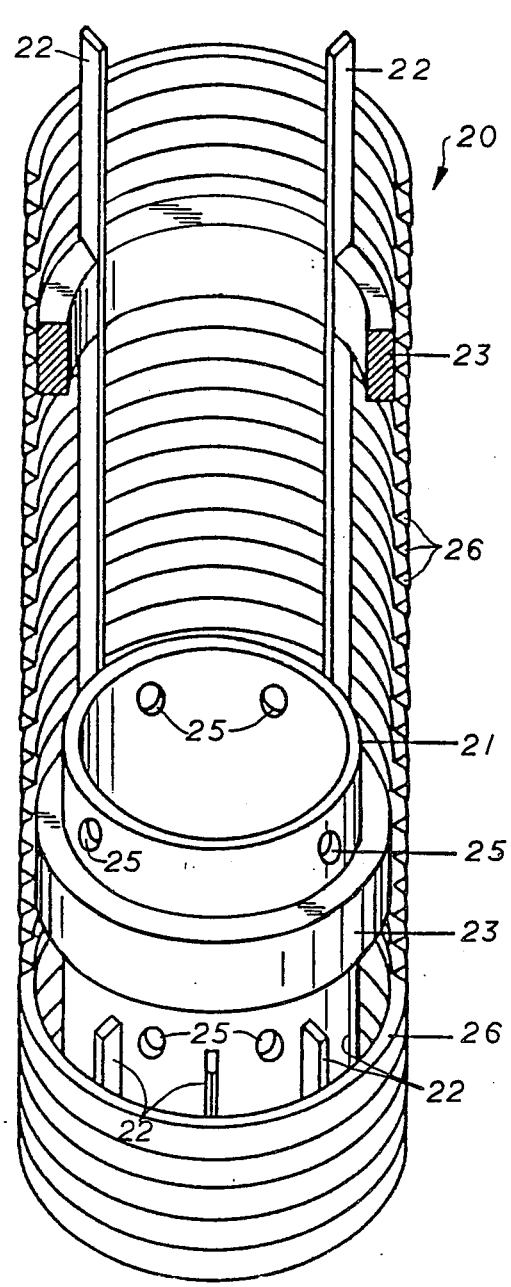
FIG. 3 is a perspective view of one embodiment of the well liner screen having portions cut away.
Figure 4:
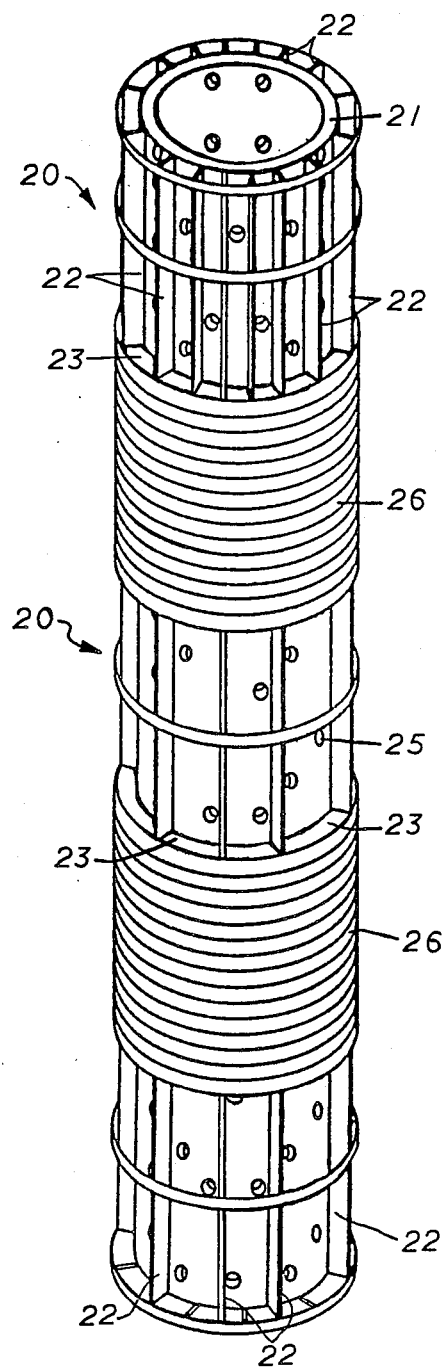
FIG. 4 is a perspective view of another embodiment of the well liner screen having portions cut away.

Referring now to FIGS. 2, 3, and 4, there is shown a well liner 20 having a selective isolation screen according to the present invention. The well liner, or "screen" 20 is shown inside of an outer casing 16 in the wellbore 17 which has been perforated 18 to allow production of fluids from formations 19 at preselected zones.

The screen 20 includes an elongate base pipe 21 surrounded by circumferentially spaced, longitudinally extending, generally rectangular spacer bars 22 and one or more annular rings or cylindrical sleeves 23 are secured to the exterior of the base pipe 21 within an inner annulus 24 at predetermined vertical locations corresponding to specific well requirements of varying lengths and production formations 19 within the wellbore 17. The base pipe 21 has a plurality of openings 25 through the sidewall. The openings 25 in the base pipe 21 may be in the form of holes, slots, or the like, and are positioned such that the sleeves 23 would not cover the openings.

A continuous wire 26 is wrapped over the spacer bars 22 and sleeves 23 in a carefully spaced spiral configuration to provide a predetermined constant gap between the wire wrapping and form the inner annulus 24 between the base pipe 21 and wire wrapping 26. A suitable wire configuration would comprise a wire of stainless steel approximately $\frac{1}{4}$" thick having a generally triangular (keystone shaped) cross section.

The gaps in the wire wrapping 26 are sized to stop the movement of the formation sand and allow continual flow of fluid into the wellbore. In "gravel pack" operations, gravel G or other particulate matter is pumped down the borehole 17 in the outer annulus between the casing 16 and the outer surface of the wire wrapping 26. The gravel G or other particulates are sized to restrain movement of the formation sand and the screen openings or gaps are designed to restrain the movement of the gravel or particulates to allow continual flow of fluids therethrough.

The sleeves 23 may be constructed of suitable materials such as metal, plastic, or rubber, and may be very thin to only fill the inner annulus at selected points, or may be quite long to fill the inner annulus over a long interval where no flow is desired. The sleeves 23 are placed strategically to prevent restriction of the flow from the producing formations of the wellbore. As shown in FIG. 4, the liner 20 may be provided with a series of vertically spaced wire wrappings 26.

The length of a sleeve may range from about 1 inch to about 5 feet. The number of sleeves may range from about 1 per each foot of screen length to about 1 per each 50 foot length of screen. The spacing of the sleeves is dictated by the spacing of perforations in the casing or open hole, and the permeability variations of productive formations exposed to the perforations or to the screen.

The number of openings or holes in the base pipe may range from 1-60 per foot, with the preferred range of from 1-20 per foot. The sizes of the hole or holes in the base pipe may range from about 1/16"-2" in diameter with the preferred range being from $\frac{3}{8}$"-1" in diameter. If slots are used, they may range from about 1/16"-2" in width and from about 1"-10" in length, with a preferred range of from $\frac{3}{8}$"-1" wide by 2"-6" long.

As one example of sleeve size and placement, assume that there is a cased wellbore with two adjacent zones, A and B, perforated as a continuous single completion, and one continuous 23 foot length of screen is used. Zone A is perforated at a subterranean interval of 8,500 feet to 8,510 feet, there are no perforations in the casing from 8,510 feet to 8,513 feet, and zone B is perforated at 8,513 feet to 8,523 feet. Zone A has an average permeability of 1,000 millidarcies and zone B has an average permeability of 200 millidarcies. A selective isolation screen may be designed to have one three foot long isolation sleeve which would be positioned at 8,510 to 8,513 feet.

With prior art wire wrapped screen designs, all fluid injected into a well of this type would preferentially flow into the highest permeability zone A, even when a washing tool which attempts to isolate the lower zone inside the base pipe is used, because flow of fluid would pass via the inner annulus of the screen. With the present selective isolation screen, the inner annulus of the screen is sealed, thus fluids can be selectively injected into the lower permeability zone B.

As another example of the size and spacing of the selective isolation screen components, assume that a wellbore has been drilled at an 80° angle from vertical with continuous perforations in the casing at subterranean depths of from 7,000 to 7,100 feet, through formations of varying permeabilities ranging from essentially zero to more than 1,000 millidarcies. A selective isolation screen may be used which has a total length of 100 feet with a 1" thick isolation sleeve every 2 feet of screen length and between the sleeves within each 2 foot length, the base pipe may have four $\frac{3}{8}$" diameter holes.

With prior art wrapped screen designs, it would be difficult to transport gravel down the outer annulus (between the screen and the casing) completely to the bottom of the screen, as fluid would flow easily through the screen and down the inner annulus and inside the base pipe causing a concentration of the gravel to form a bridge in the outer annulus. Prior art screens commonly have from 100 (on 3.5" diameter base pipe screens) to 180 (on 5.5" diameter base pipe screens) $\frac{3}{8}$" diameter holes per foot of screen. Even with a large diameter wash pipe that is designed to restrict fluid flow inside the base pipe, fluid would still be able to flow through the unrestricted inner annulus. With a selective isolation screen as described above, the combination of limited numbers of holes in the base pipe and the multiple isolation sleeves would reduce the loss of fluid from the outer annulus, thus maintain adequate fluid velocity to transport gravel fully to the bottom of the screen.

OPERATION

In operation, the liner 20 with wire wrapped screen thereon is connected in the production string in the borehole.

The continuous wire 26 is wrapped over the spacer bars 22 and sleeves 23 in a carefully spaced spiral configuration to provide a predetermined constant gap between the wire wrapping and form an inner annulus 24 between the base pipe 21 and wire wrapping 26. The spacer bars 22 are present in sufficient number, e.g. 4–16, to space the wire wrapping adequately from the base pipe 21. As previously noted, a stainless steel wire of generally triangular cross section is preferred. The clearance in the wire wrapping 26 is such that movement of the formation sand into the liner is prevented and continuous flow of fluid into the wellbore is allowed.

In "gravel pack" operations, gravel G or other particulate matter is pumped down the borehole in the outer annulus between the casing 16 and the outer surface of the wire wrapping 26. The openings 25 in the liner are spaced at about 1–20 holes per foot. The gravel G or other particulates restrain movement of the formation sand while the screen openings restrain the movement of the gravel or particulates to allow continual flow of fluids therethrough.

The sleeves 23 may be constructed of suitable materials such as metal, plastic, or rubber, and may be very thin to only fill the inner annulus at selected points, or may be quite long to fill the inner annulus over a long interval where no flow is desired. The sleeves are placed strategically to prevent restriction of the flow from the producing formations of the wellbore.

The wire wrapped screen in accordance with the present invention will effectively control the injection of acids and fluids into the screen such that every section of the screen may be selectively washed and no section of the screen is bypassed through the inner annulus. For example, in a well which used particles such as calcium carbonate to control the fluid loss rate in the well prior to placement of a conventional well liner sleeve and gravel pack, an acid treatment with 15% hydrochloric acid was pumped into the well just prior to the gravel pack, and subsequently required numerous acid treatments to dissolve enough calcium carbonate to improve the flow rate to be near its potential capacity.

The present invention allows complete dissolving of the calcium carbonate by isolating sections of the screen by inserting a squeeze type tool with isolation cups in the base pipe (21) at points matching the sleeve (26) locations. As acid is injected via the squeeze type tool, it is forced into each isolated section of the screen and radially out into the formation, without flowing vertically through the screen inner annulus, thus bypassing the intended target formation.

Acid wash techniques using common diverting agents, such as ball sealers, are not practical with prior art sleeves, as the acid is able to flow through the inner annulus and run vertically to the same zone it would have gone to without the ball sealers. With the present invention, limited numbers and sizes of holes are provided in the base pipe between the isolation sleeves. For example, isolation sleeves may be provided every three feet throughout the length of the screen body, and the base pipe may be provided with one hole between each interval that is isolated. The diameter of the holes would be determined by the production capacity of the well, or of the interval that is to be isolated.

The isolating sleeves provide a well liner screen whereby fluids may be injected into selective sections of the screen to prevent bypassing of fluids through the inner annulus, and is also particularly useful in facilitating gravel packing operations in highly deviated wellbores. A well liner having a selective isolation screen will aid in injection of water shut off chemicals, diverting of injected water from thief zones, and other treatments requiring some control or injection into selected locations.

While this invention has been described fully and completely with special emphasis upon a preferred embodiment, it should be understood that within the scope of the appended claims the invention may be practiced otherwise than as specifically described herein.

I claim:

1. A well liner having a selective isolation screen for placement within a wellbore comprising;
    an elongate tubular member having a plurality of spaced apertures therethrough,
    spacer means on said tubular member for forming a longitudinal fluid flow annulus circumferentially surrounding said tubular member and in fluid communication with the apertures of said tubular member,
    screen means surrounding said spacer means to form the exterior of said annulus and having openings therethrough in fluid communication with said annulus and said apertures, and
    circumferentially extending seal means vertically spaced on said tubular member within said annulus for isolating and sealing off communication between said apertures and screen openings at selected vertical locations along its length corresponding to specific well requirements of varying lengths and the spacing of production formations within the wellbore and the permeability variations of productive formations exposed to said apertures and screen openings.

2. A well liner according to claim 1 in which said spacer means comprises a plurality of elongate bar members circumferentially spaced and extending longitudinally about the exterior surface of said tubular member.

3. A well liner according to claim 2 in which there are from about 4 to about 16 of said elongate bar members equally spaced around said tubular member to support said screen means, and said tubular member has about 1–60 apertures per linear foot.

4. A well liner according to claim 3 in which said apertures comprise holes ranging from about 1/16"–2" in diameter.

5. A well liner according to claim 3 in which said apertures comprise holes ranging from $\frac{3}{8}$"–1" in diameter.

6. A well liner according to claim 3 in which said apertures comprise slots ranging from about 1/16"–2" wide and from about 1"–10" in length.

7. A well liner according to claim 3 in which said apertures comprise slots ranging from $\frac{3}{8}$"–1" wide and from 2"–6" in length.

8. A well liner according to claim 2 in which there are from about 4 to about 16 of said elongate bar members equally spaced around said tubular member to support said screen means, and said tubular member has about 1–60 apertures per linear foot.

9. A well liner according to claim 8 in which said apertures comprise holes ranging from about 1/16"–2" in diameter.

10. A well liner according to claim 8 in which said apertures comprise holes ranging from ⅜"-1" in diameter.

11. A well liner according to claim 8 in which
said apertures comprise slots ranging from about 1/16"-2" wide and from about 1"-10" in length.

12. A well liner according to claim 8 in which
said apertures comprise slots ranging from ⅜"-1" wide and from 2"-6" in length.

13. A well liner according to claim 1 in which
said seal means comprises one or more generally cylindrical sleeve members secured to the exterior of said tubular member at predetermined vertical locations.

14. A well liner according to claim 13 in which
said sleeve members comprise a thin cylindrical configuration sized to seal said annulus at selected strategic points to prevent restriction of the flow into or from the producing formations of the wellbore.

15. A well liner according to claim 13 in which
said sleeve members comprise an elongate cylindrical configuration to seal said annulus over one or more elongate sections at strategic locations where no flow is desired and to prevent flow into or from the producing formations of the wellbore.

16. A well liner according to claim 13 in which
the number of said sleeve members range from about 1 per each foot to about 1 per each 50 foot length of said screen means.

17. A well liner according to claim 13 in which
said sleeve members comprise one or more cylindrical members ranging in length from about 1 inch to about 5 feet.

18. A well liner according to claim 1 in which
said screen means comprises a continuous wire wrapped over said spacer means and said seal means in a spaced spiral configuration to provide a predetermined constant gap between the wire wrappings and forming an inner annulus between said tubular member and the wire wrapping,
said gaps in the wire wrapping sized to prevent movement of the formation sand into said annulus and allow continual flow of fluid into the wellbore.

19. A well liner according to claim 18 including
one or more said wire wrappings longitudinally spaced at predetermined vertical locations along the length of said tubular member corresponding to specific well requirements of varying lengths and production formations within the wellbore.

20. A well liner according to claim 1 including
gravel or other particulate matter disposed in the outer annulus area between said screen means and the interior of the wellbore and sized to restrain movement of sand from the formation sand through said screen means openings.

21. A well liner according to claim 1 including
a cylindrical casing disposed in the wellbore and having a perforated sidewall for allowing fluid to flow thereinto from adjacent formations, and
gravel or other particulate matter disposed in the outer annulus area between said screen means and the interior of said casing and sized to restrain movement of sand from the formation sand through said screen means openings.

22. A well liner having a selective isolation screen for placement within a wellbore comprising;
an elongate tubular member having a plurality of spaced apertures therethrough,
a plurality of elongate spacer bars circumferentially spaced and extending longitudinally about the exterior surface of said tubular member,
one or more generally cylindrical sleeves secured to the exterior of said tubular member at predetermined vertical locations along its length corresponding to specific well requirements of varying lengths and production formations within the wellbore, and
a continuous wire wrapped over said spacer bars and said sleeves in a spaced spiral configuration to provide a predetermined constant gap between the wire wrapping and forming an inner annulus between said tubular member and said wire wrapping.

23. A well liner according to claim 22 in which
there are from about 4 to about 16 of said elongate bar members equally spaced around said tubular member to support said screen means, and
said tubular member has about 1-60 apertures per linear foot.

24. A well liner according to claim 22 in which
there are from about 4 to about 16 of said elongate bar members equally spaced around said tubular member to support said screen means,
said tubular member has about 1-60 apertures per linear foot, and
said wire is about ¼" and of triangular cross section.

25. A well liner according to claim 24 in which
said sleeve members range from about 1 per each foot to about 1 per each 50 foot length of said wire wrapped portion and range from about 1 inch to about 5 feet in length.

26. A well liner according to claim 25 in which
said apertures comprise holes ranging from about ⅜"-1" in diameter.

27. A well liner according to claim 25 in which
said apertures comprise slots ranging from about ⅜"-1" wide and from 2"-6" in length.

* * * * *